(12) United States Patent
Gretz

(10) Patent No.: US 7,854,627 B1
(45) Date of Patent: Dec. 21, 2010

(54) ELECTRICAL FITTING WITH INTERNAL CABLE RETAINER

(75) Inventor: Thomas J. Gretz, Port St. Lucie, FL (US)

(73) Assignee: Arlington Industries, Inc., Scranton, PA (US)

( * ) Notice: Subject to any disclaimer, the term of this patent is extended or adjusted under 35 U.S.C. 154(b) by 46 days.

(21) Appl. No.: 12/387,125

(22) Filed: Apr. 28, 2009

(51) Int. Cl.
*H01R 13/73* (2006.01)

(52) U.S. Cl. ..................................... 439/557

(58) Field of Classification Search ................. 439/557, 439/551, 63, 92, 98; 174/663, 50, 51, 657
See application file for complete search history.

(56) References Cited

U.S. PATENT DOCUMENTS

| 5,594,209 | A | 1/1997 | Nattel et al. |
| 6,034,326 | A | 3/2000 | Jorgensen |
| 6,444,907 | B1 * | 9/2002 | Kiely .......................... 174/657 |
| 6,555,750 | B2 * | 4/2003 | Kiely .......................... 174/657 |
| 6,596,939 | B1 * | 7/2003 | Gretz .......................... 174/359 |
| 6,682,355 | B1 | 1/2004 | Gretz |
| 7,057,107 | B2 | 6/2006 | Auray et al. |
| 7,381,088 | B1 | 6/2008 | Gretz |
| 2007/0278006 | A1 * | 12/2007 | Gardner ....................... 174/659 |

* cited by examiner

*Primary Examiner*—Alexander Gilman

(57) ABSTRACT

An electrical fitting for rapid connection of an electrical cable to a panel or a junction box. The electrical fitting includes an improved arrangement on the trailing end for securing electrical cables thereto. A connector body having a cavity in the trailing end includes a cable retainer secured therein. The cable retainer includes a substantially tubular body and is constructed of spring steel. The tubular body includes a flat portion and an arcuate portion. A single cable retaining tang extends inwardly from the flat portion. A substantial portion of the single tang is split by a notch thereby creating two fingers on the tang. The two-fingered tang enables the fitting to accommodate a wide range of electrical cables.

16 Claims, 10 Drawing Sheets

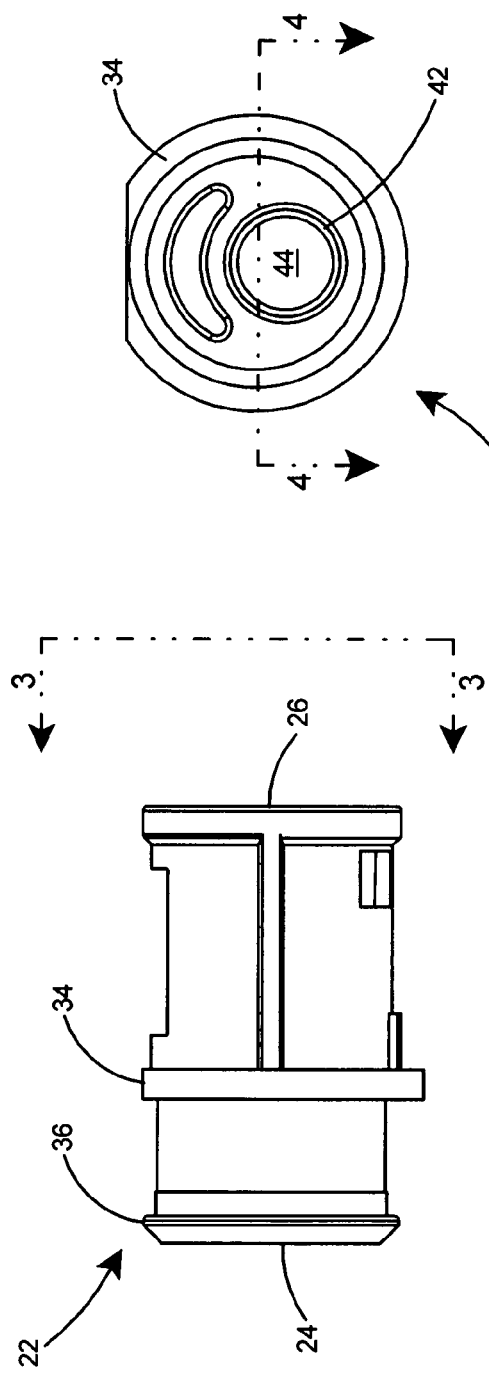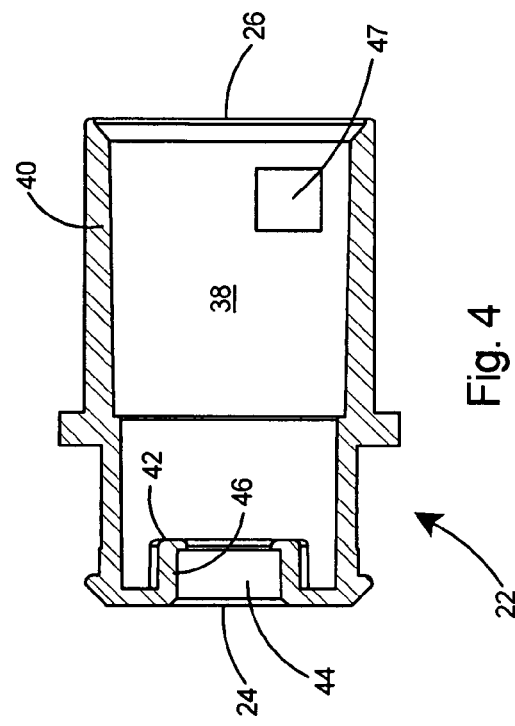

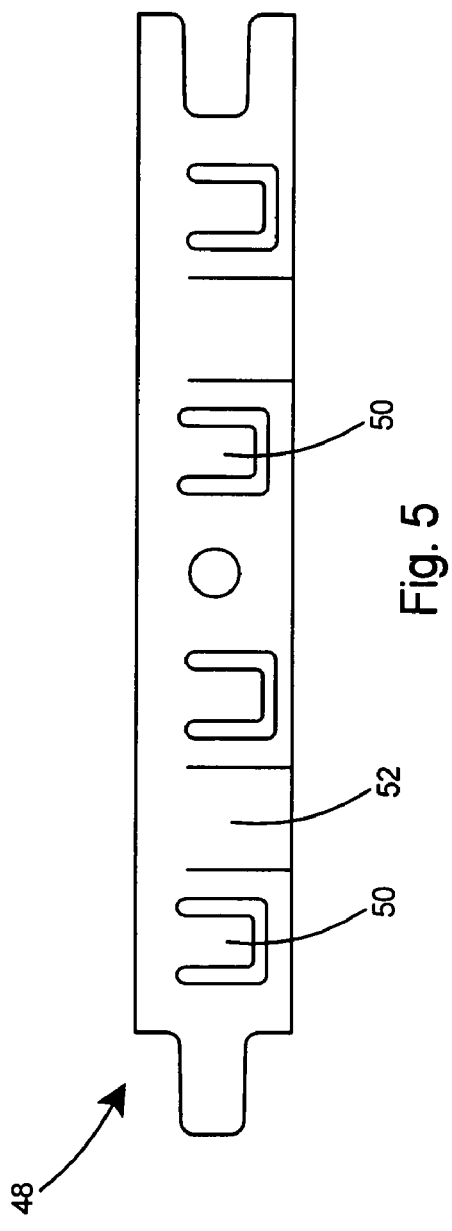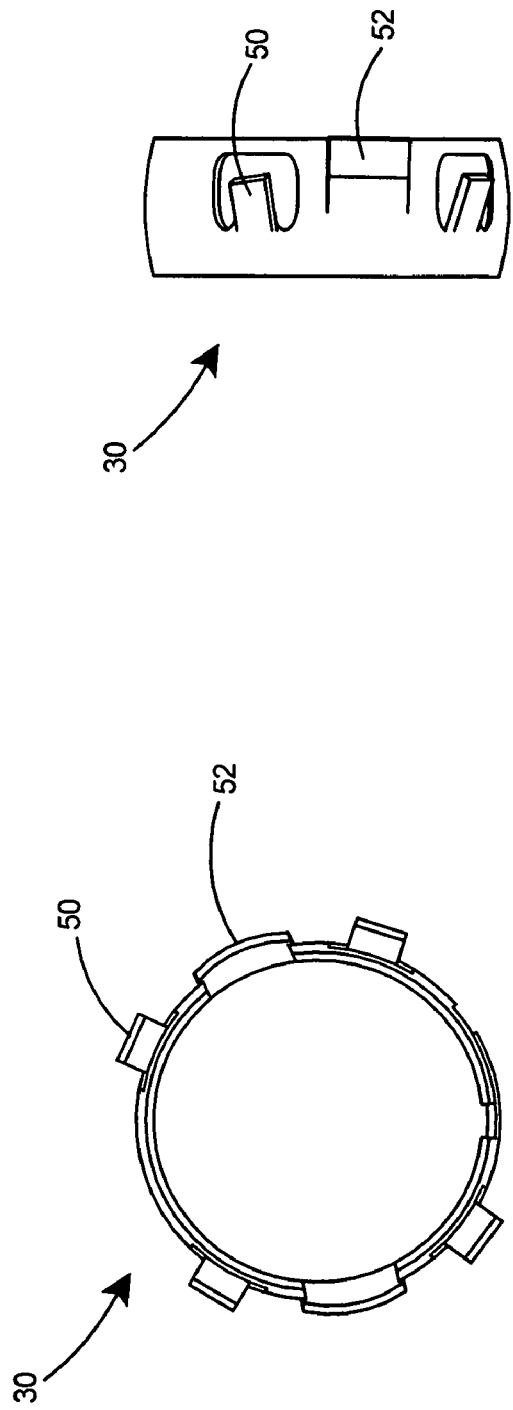

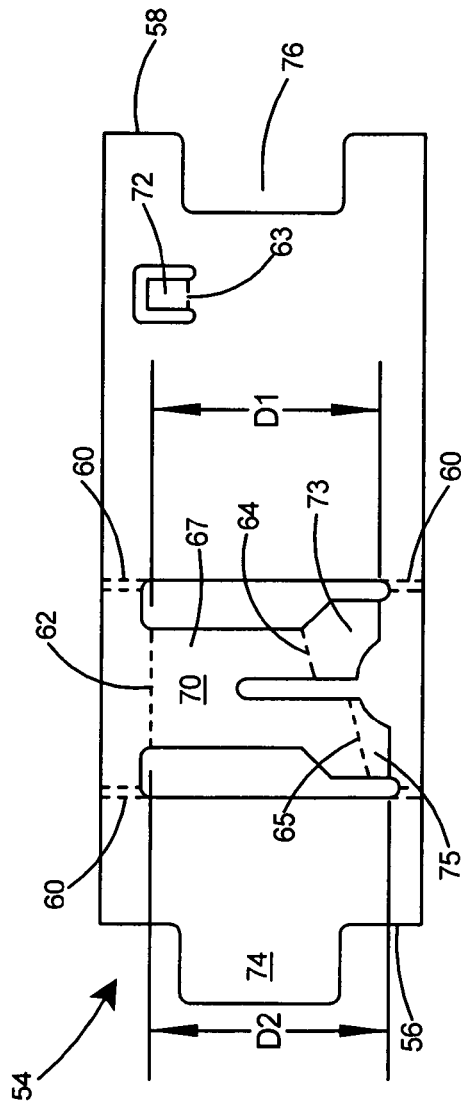
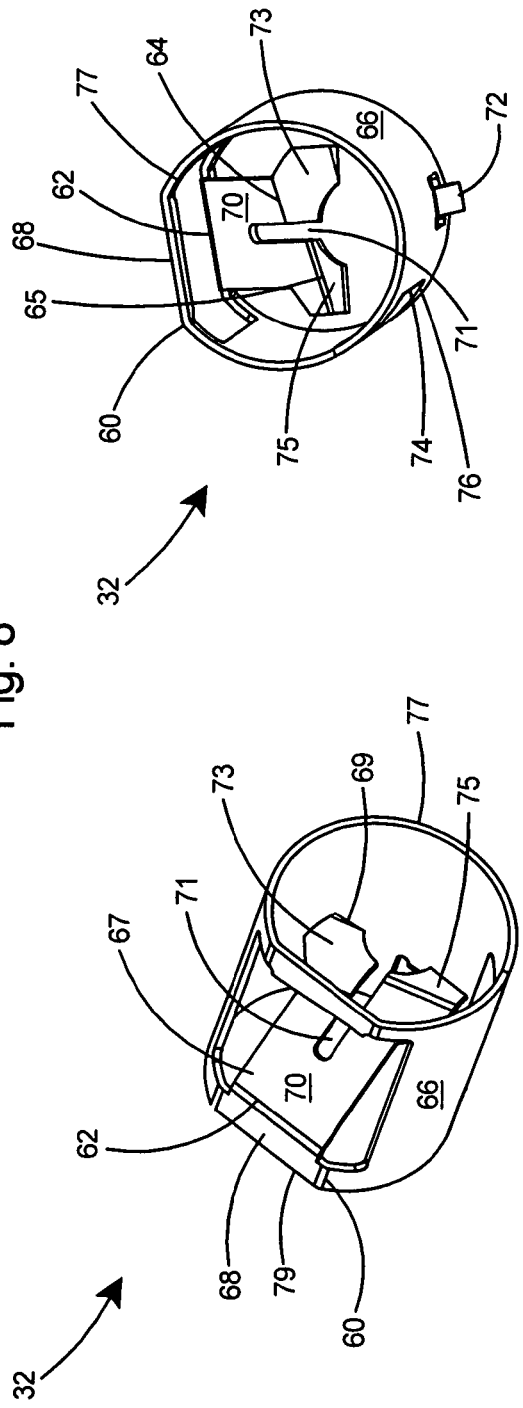
Fig. 8
Fig. 9
Fig. 10

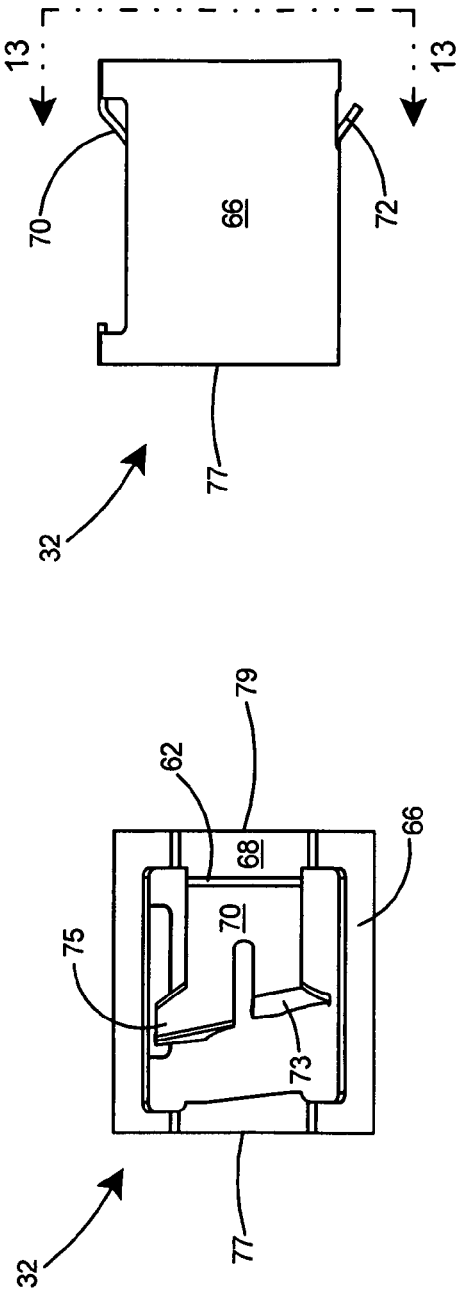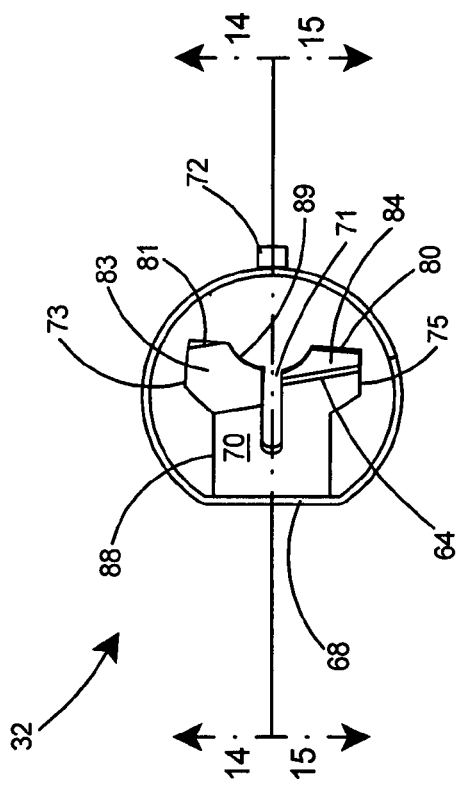

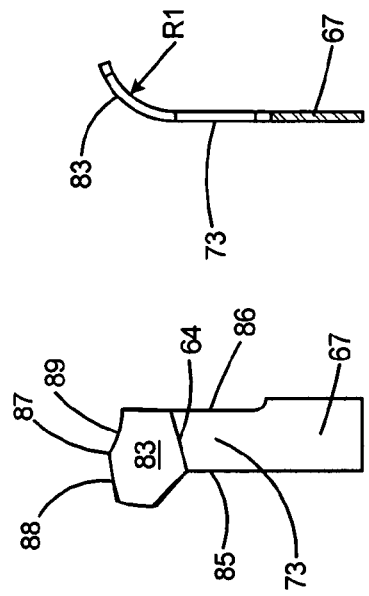
Fig. 24
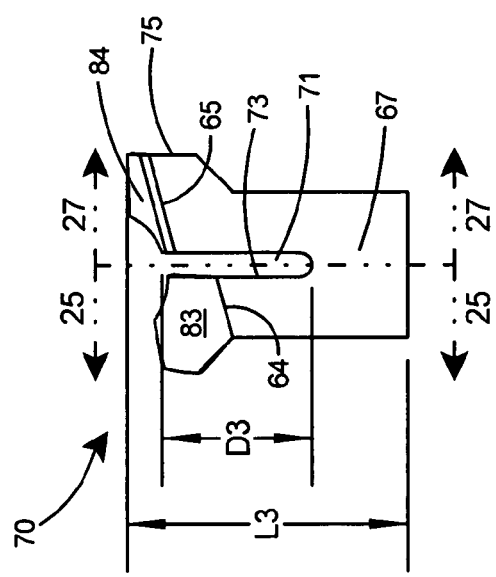
Fig. 23
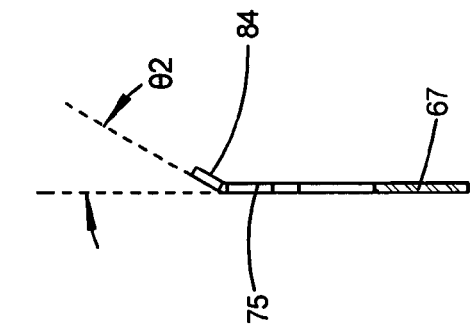
Fig. 25
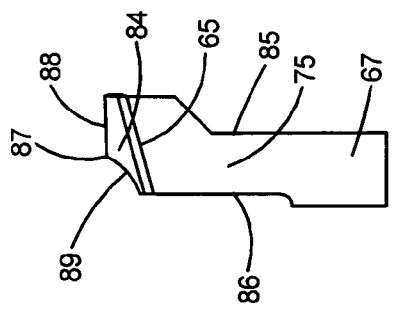
Fig. 26
Fig. 27

ELECTRICAL FITTING WITH INTERNAL CABLE RETAINER

FIELD OF THE INVENTION

This invention relates to fittings for connecting electrical cables to a panel and specifically to an electrical fitting having an improved arrangement for receiving a wide range of sizes of conventional electrical cables.

BACKGROUND OF THE INVENTION

Snap fit electrical fittings have been developed to enable rapid connection of electrical cables to electrical panels or boxes. U.S. Pat. No. 7,381,088, having common ownership with the present invention, included a snap fit electrical fitting with a tubular body, a cavity on the trailing end, a cylindrical-shaped split ring that is inserted into the cavity, and a cable gripping tang with a single finger extending inward of the split ring for securing a cable to the trailing end of the connector. The single finger ring provided simpler construction than prior art cable retaining rings, thereby making it easier to manufacture and cheaper to produce than prior art internal cable retaining rings.

By providing a cable retaining ring having a single tang and multiple fingers, the inventor has discovered unexpected results in that the range of conventional cable sizes that can be accommodated by the electrical connector is greatly improved. The present invention therefore is directed to an electrical connector that accommodates a large range of nominal cable sizes thereby enhancing the utility of the connector and greatly reducing stocking requirements as a single connector can take the place of several prior art connectors.

SUMMARY OF THE INVENTION

The invention is an electrical fitting having an improved arrangement on the trailing end for securing electrical cables thereto. A connector body having a cavity in the trailing end includes a cable retainer secured therein. The cable retainer includes a substantially tubular body and is constructed of spring steel. The tubular body includes a flat portion and an arcuate portion. A single cable retaining tang extends inwardly from the flat portion. A substantial portion of the single tang is split by a notch thereby creating two fingers on the tang. The two-fingered tang enables the fitting to accommodate a wide range of electrical cables.

OBJECTS AND ADVANTAGES

Several advantages are achieved with the electrical fitting of the present invention, including:
(1) The electrical fitting includes, a cable retainer with a two-finger tang that provides enhanced flexing ability for accommodating electrical cables as they are inserted into the fitting.
(2) A much wider range of electrical cables can be accommodated by a single size fitting. A single size fitting can, for example, accommodate five sizes of MCAP (metal clad all purpose) cable, such as produced by Southwire Company, One Southwire Drive, Carrollton, Ga., including sizes 12-2 through 10-3.
(3) Stocking requirements by electrical suppliers and electricians in the field are greatly reduced as one connector according to the present invention can accommodate a wide range of conventional cable sizes that are typically encountered on the job site.
(4) The single tang construction of the cable retaining ring is cheaper to produce than prior art rings including multiple tangs.
(5) The split tang two-finger construction securely grips any cables inserted within the trailing end of the connector and provides excellent strain relief thereby preventing removal of the cables by stress applied to the cables.

These and other objects and advantages of the present invention will be better understood by reading the following description along with reference to the drawings.

DESCRIPTION OF THE DRAWINGS

FIG. 2 is a side view of a connector body that forms a portion of the electrical fitting shown in FIG. 1.

FIG. 3 is an end view of the connector body as viewed from line 3-3 of FIG. 2.

FIG. 4 is a sectional view of the connector body taken along line 4-4 of FIG. 2.

FIG. 5 is a plan view of a blank used to form a cylindrical snap ring fastening arrangement for the leading end of the connector body in FIG. 2.

FIG. 6 is an end view of a cylindrical snap ring that has been formed from the blank of FIG. 5.

FIG. 7 is a side view of the cylindrical snap ring of FIG. 6.

FIG. 8 is a plan view of a blank used to form a cable retainer for the trailing end of the connector body in FIG. 2.

FIG. 9 is a perspective view from the leading end of a cable retainer that has been formed from the blank of FIG. 8.

FIG. 10 is a perspective view from the trailing end of the cable retainer of FIG. 9.

FIG. 11 is a side view of the cable retainer of FIG. 9.

FIG. 12 is another side view of the cable retainer of FIG. 9.

FIG. 13 is an end view of the cable retainer as viewed from line 13-13 of FIG. 12.

FIG. 23 is a plan view of the cable retaining tang portion of the electrical fitting of the present invention.

FIG. 24 is a plan view of a first finger portion of the cable retaining tang of FIG. 23.

FIG. 25 is a sectional view of the first finger of the cable retaining tang taken along line 25-25 of FIG. 23.

FIG. 26 is a plan view of a second finger portion of the cable retaining tang of FIG. 23.

FIG. 27 is a sectional view of the second finger of the cable retaining tang taken along line 27-27 of FIG. 23.

INDEX TO REFERENCE NUMERALS IN DRAWINGS

| 20  | electrical fitting, preferred embodiment |
| --- | --- |
| 22  | connector body |
| 24  | leading end of connector body |
| 26  | trailing end of connector body |
| 28  | fastening arrangement |
| 30  | snap ring |
| 32  | cable retainer |
| 34  | central flange |
| 36  | end flange |
| 38  | cavity |
| 40  | wall of connector body |
| 42  | partial closure |
| 44  | opening in partial closure |
| 46  | edge of partial closure |
| 47  | opening in surrounding wall |
| 48  | snap ring blank |
| 50  | panel engagement tang |
| 52  | grounding tang |
| 54  | cable retainer blank |
| 56  | first end |
| 58  | second end |
| 60  | lateral bend line |
| 62  | first bend line |
| 63  | bend line for locking tang |
| 64  | second bend line |
| 65  | third bend line |
| 66  | tubular body of cable retainer |
| 67  | base portion of cable retaining tang |
| 68  | flat portion |
| 69  | end of cable retaining tang |
| 70  | cable retaining tang |
| 71  | notch |
| 72  | locking tang |
| 73  | first finger |
| 74  | tab |
| 75  | second finger |
| 76  | groove |
| 77  | leading end of cable retainer |
| 78  | proximate end of cable retaining tang |
| 79  | trailing end of cable retainer |
| 80  | distal end of first finger |
| 81  | distal end of second finger |
| 82  | longitudinal axis |
| 83  | end portion of first finger |
| 84  | end portion of second finger |
| 85  | outer side of cable retaining tang |
| 86  | inner side of cable retaining tang |
| 87  | distal edge of cable retaining tang |
| 88  | flat portion of distal edge |
| 89  | arcuate portion of distal edge |
| 98  | insert |
| 100 | end flange of insert |
| 102 | smooth seat |
| 104 | nose section of insert |
| 106 | center bore of insert |
| 108 | securing arrangement |
| 110 | aperture in panel |
| 112 | panel |
| 114 | electrical fitting, alternative embodiment |
| 116 | fastening arrangement, alternative embodiment |
| 118 | threads |
| 120 | leading end |
| 122 | connector body, alternative embodiment |
| 124 | nut |

-continued

| 126 | electrical cable of first diameter |
| --- | --- |
| 128 | electrical cable of second diameter |
| D1  | width of single cable retaining tang |
| D2  | inner diameter of cable retainer |
| D3  | depth of notch |
| L3  | length of cable retaining tang |
| R1  | radius of end portion of first finger |
| θ1  | angle of cable retaining tang with respect to longitudinal axis |
| θ2  | angle of end portion of second finger with respect to base portion |

DETAILED DESCRIPTION OF THE INVENTION

Figure 1:
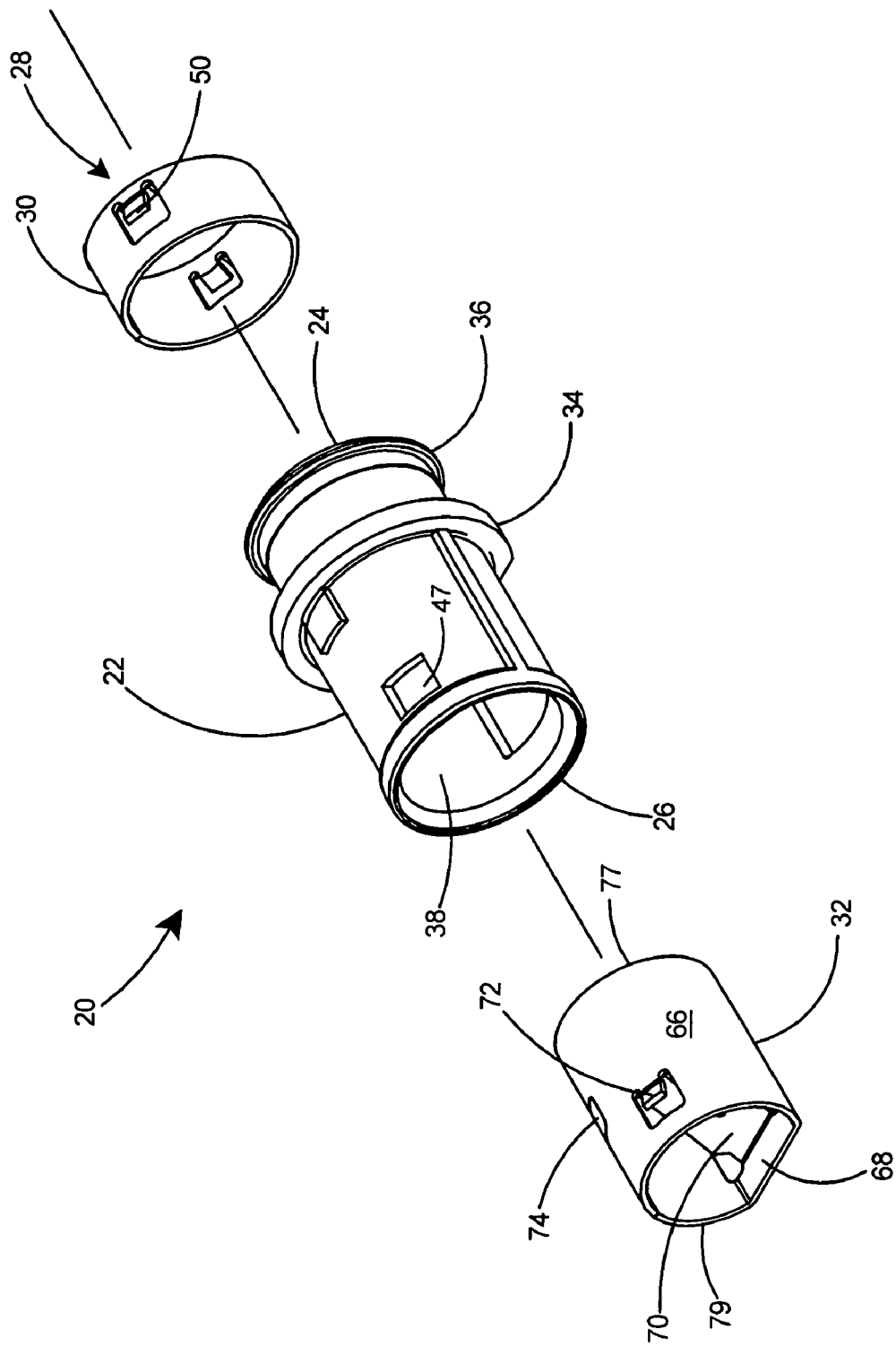
FIG. 1 is an exploded perspective view of the preferred embodiment of an electrical fitting according to the present invention.

With reference to FIG. 1 there is shown an exploded view of a preferred embodiment of the present invention, an electrical fitting 20 having an improved arrangement for the securing of electrical cables thereto. The preferred embodiment of the electrical fitting 20 includes a connector body 22 including a leading end 24 and a trailing end 26. A fastening arrangement 28 on the leading end 24 of the connector body 22 includes a cylindrical snap ring 30 for securing the connector body 22 to a panel (not shown). A cable retainer 32 is inserted within the trailing end 26 of the connector body 22 to form the electrical fitting 20 of the present invention.

With reference to FIGS. 2-4, the connector body 22 includes a central flange 34 between the trailing end 26 and the leading end 24, an end flange 36 on the leading end 24, and a cavity 38 including a surrounding wall 40 in the trailing end 26. The connector body 22 further includes a partial closure 42 on the leading end 24, an opening 44 in the partial closure 42, and edges 46 on the partial closure 42 surrounding the opening 44. An opening 47 is provided in the surrounding wall 40 of the connector body.

Referring to FIGS. 5-7, the cylindrical snap ring 30 of the preferred embodiment is formed from a blank 48 as shown in FIG. 5 into a substantially cylindrical shape as shown in FIGS. 6 and 7. The snap ring 30 includes panel engagement tangs 50 and grounding tangs 52 bent outwards of the ring.

The critical features that provide the several advantages of the present invention are realized from the arrangement of the cable retainer 32 as shown in FIGS. 8-13. As shown in FIG. 8, the cable retainer 32 is formed from a flat blank 54 of spring steel having two ends 56 and 58. The blank 54 includes bend lines 60 laterally across the blank 54 and separate bend lines 62, 63, 64, and 65 longitudinally along the blank. The blank 54 of FIG. 8 will be formed into a substantially tubular body 66 as shown in FIGS. 9 and 10 but with a flat portion 68 formed between bend lines 60. A cable retaining tang 70 is formed by bending inward of the tubular body 66 at first bend line 62 in the flat portion 68 and a locking tang 72 formed by bending outward of the tubular body 66 at bend line 63. The cable retaining tang 70 includes a base portion 67 and an end 69 and is split into two fingers by notch 71 that extends a substantial distance from the end 69 of the tang 70 and divides the cable retaining tang 70 into a first finger 73 and a second finger 75. The first finger 73 of the cable retaining tang 70 is bent inward at second bend line 64 and the second finger 75 bent inward at third bend line 65. The first end 56 of the blank 54 includes a tab 74 and the second end 58 includes a groove 76. When the blank 54 is formed into the substantially tubular cable retainer 32, as shown in FIGS. 9 and 10, the tab 74 extends into the groove 76. The first finger 73 extends a lesser distance, as shown by distance D1 in FIG. 8, from the cable retainer 32 than does the second finger 75 shown by distance D2. Bend lines 60, 62, 63, 64, and 65 are all straight lines.

With reference to FIGS. 11-13, the cable retainer 32 includes a substantially tubular body 66 with a flat portion 68, a cable retaining tang 70 with two fingers 73 and 75 projecting inward from the flat portion 68 of the tubular body 66, and a locking tang 72 projecting outward from the tubular body 66. The cable retainer 32 includes a leading end 77 and a trailing end 79.

Figure 14:
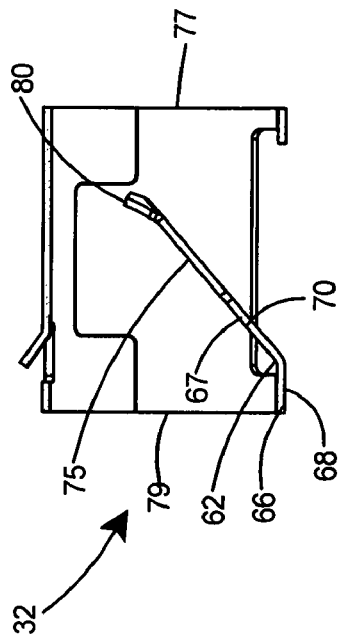
FIG. 14 is a sectional view of the cable retainer as taken along line 14-14 of FIG. 13.
Figure 15:
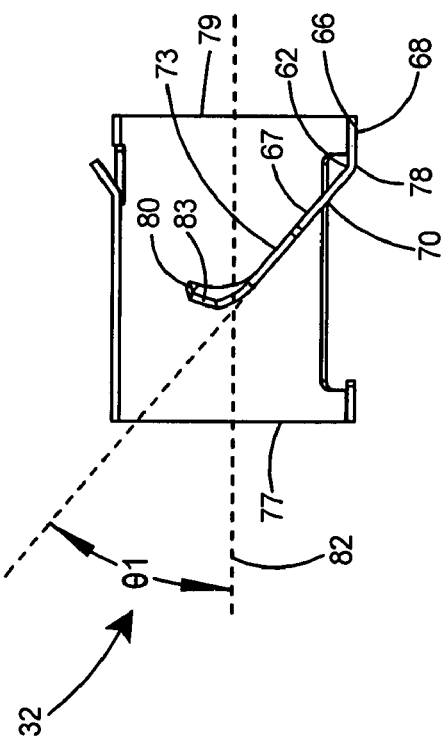
FIG. 15 is a sectional view of the cable retainer as taken along line 15-15 of FIG. 13.

As shown in FIG. 14, the cable retaining tang 70 includes a proximate end 78 at the juncture of the cable retaining tang 70 with the flat portion 68. The tubular body 66 of the cable retainer 32 includes a longitudinal axis 82 and cable retaining tang 70 is at an angle θ1 of between 35 and 45 degrees with respect to the longitudinal axis 82. First finger 73 includes a distal end 80 and an end portion 83 thereon. As shown in FIG. 15, second finger 75 includes a distal end 81 and an end portion 84 thereon. The end portion 83 of the first finger 73 and the end portion 84 of the second finger 75 are each angled away from the base portion 67 of the cable retaining tang 70 and toward the trailing end 79 of the cable retainer 32.

Figure 17:
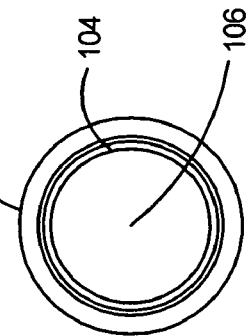
FIG. 17 is an end view of the insert as viewed from line 16-16 of FIG. 16.
Figure 16:
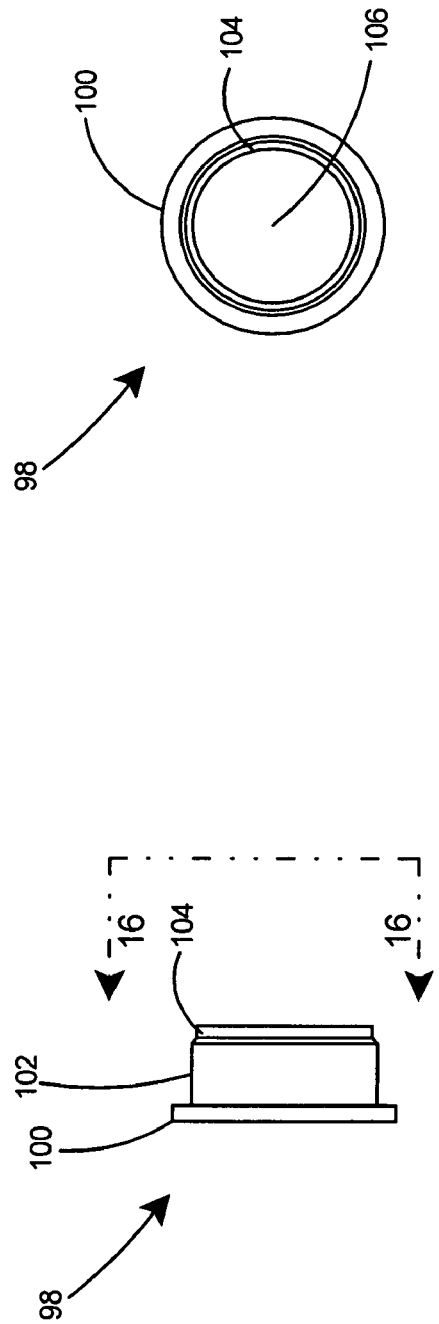
FIG. 16 is a side view of an insert that can form a portion of the electrical fitting of the present invention.
Figure 18:
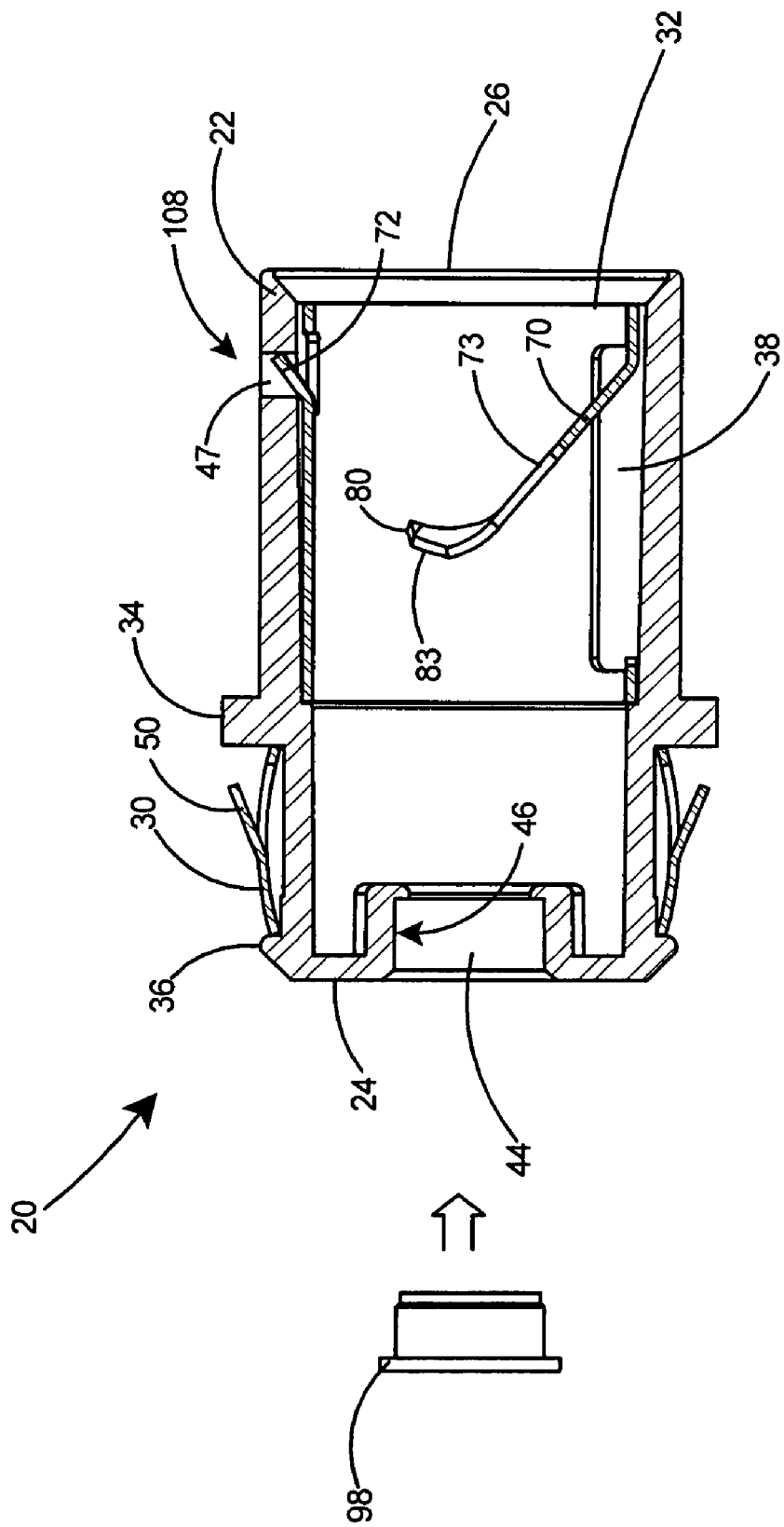
FIG. 18 is a sectional view of the preferred embodiment of the electrical fitting including a cable retaining tang secured in the trailing end of the connector body and the insert of FIG. 14 inserted in the leading end of the connector body.

A tubular insert 98 which may optionally be used with the electrical fitting of the present invention is depicted in FIGS. 16 and 17. The insert 98 includes an end flange 100, a smooth seat 102, a necked-down nose section 104, and a center bore 106. As shown in FIG. 18, the insert 98 may be pressed into the opening 44 of the partial closure 42 on the leading end 24 of the connector body 22 to substantially cover the edges 46 of the opening 44. The insert 98 acts to protect the outer sheaths of any wiring (not shown) that is later advanced through the opening 44 within the partial closure 42 of the connector body 22. The insert 98 is preferably molded of plastic.

As depicted in FIG. 18, the cable retainer 32 includes the locking tang 72 that along with the opening 47 in the trailing end 26 of the connector body 22 forms a securing arrangement 108 for locking the cable retainer 32 within the cavity 38 in the trailing end 26 of the connector body 22. As the cable retainer 32 is typically formed of spring steel and is a split ring, it can be compressed or biased inwards and inserted into the cavity 38 at the trailing end 26 of the connector body 22. The locking tang 72 of the cable retainer 32 is aligned with the opening 47 in the trailing end 26 of the connector body 22 as the cable retainer 32 is compressed and inserted therein. After the cable retainer 32 has been inserted into the cavity 38, the cable retainer 32 is released and springs outward partially toward its unbiased shape and the locking tang 72 extends into the opening 47 in the connector body 22 thereby locking the cable retainer 32 within the cavity 38. At the leading end 24 of the connector body 22, the snap ring 30 is typically constructed of spring steel and is biased outward or expanded in size and slipped over end flange 36 until it seats on the leading end 24 of the connector body 22. Panel engagement tangs 50 extend outward from the snap ring 30.

Figure 19:
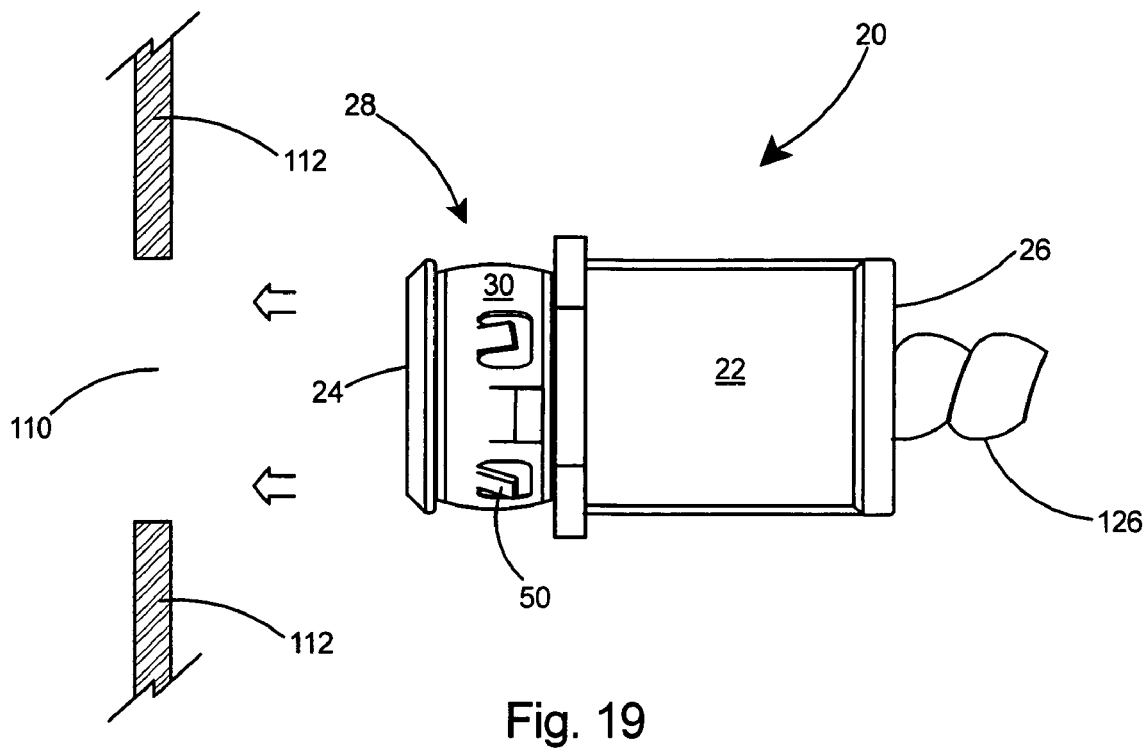
FIG. 19 is a side view of the preferred embodiment of an electrical fitting according to the present invention in alignment with a panel to which it will be snap fitted.

With reference to FIG. 19, the preferred embodiment of the electrical fitting 20 has a fastening arrangement 28 that includes a substantially cylindrical snap ring 30 on the leading end 24 of the connector body 22. The preferred embodiment of the electrical fitting 20 can be easily snapped into an aperture 110 in a panel 112 by simply pressing the leading end 24 of the connector body 22 into the aperture 110. The panel engagement tangs 50 are compressed by the panel 112 as they are pressed there through and snap outward to their unbiased position as they clear the panel 112, thereafter holding the connector body 22 securely to the panel.

Figure 20:
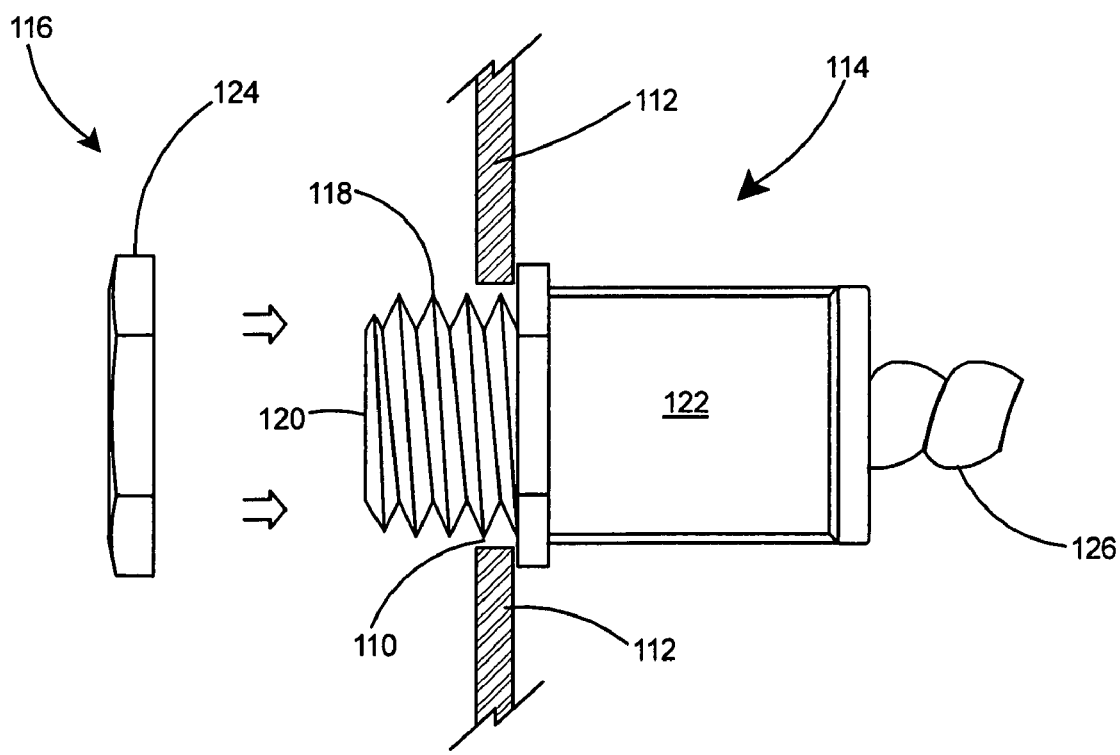
FIG. 20 is a side view of a second embodiment of an electrical fitting according to the present invention in alignment with a panel to which it will be secured by a locknut.

FIG. 20 depicts an alternative embodiment 114 of the electrical fitting. The alternative embodiment of the electrical fitting 114 has a fastening arrangement 116 that includes threads 118 on the leading end 120 of the connector body 122 and a nut 124 for engaging the threads 118.

Figure 21:
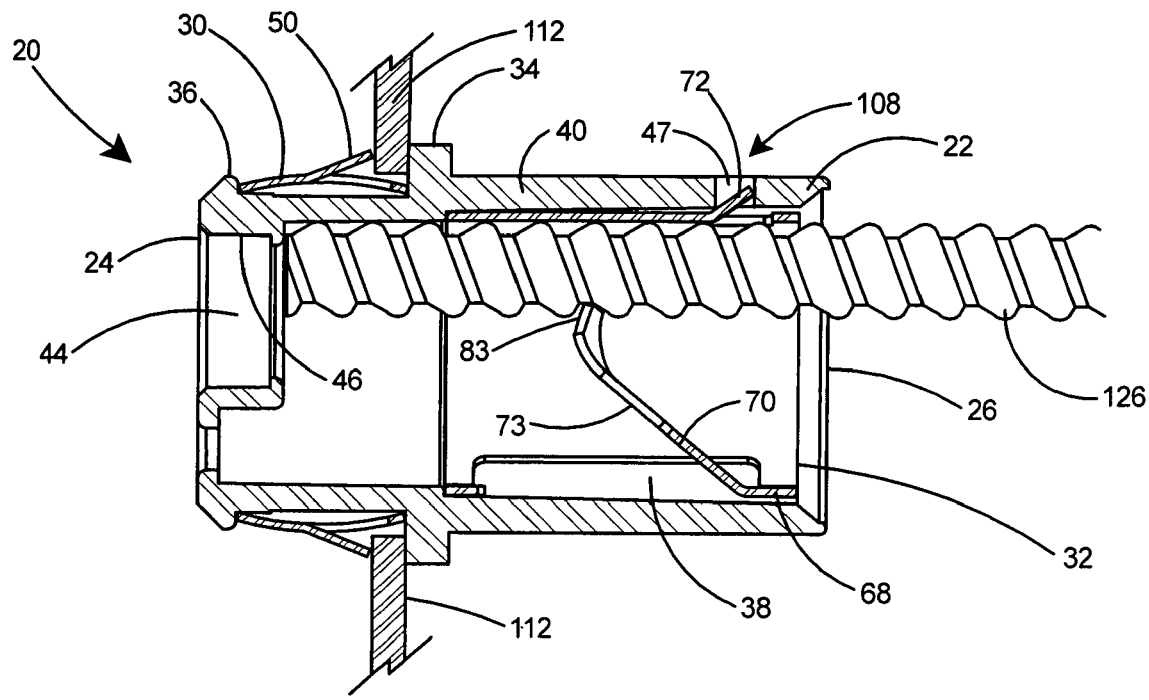
FIG. 21 is a sectional view of the preferred embodiment of the electrical fitting including a cable retainer secured in the trailing end of the connector body and a small diameter MCAP cable secured therein.
Figure 22:
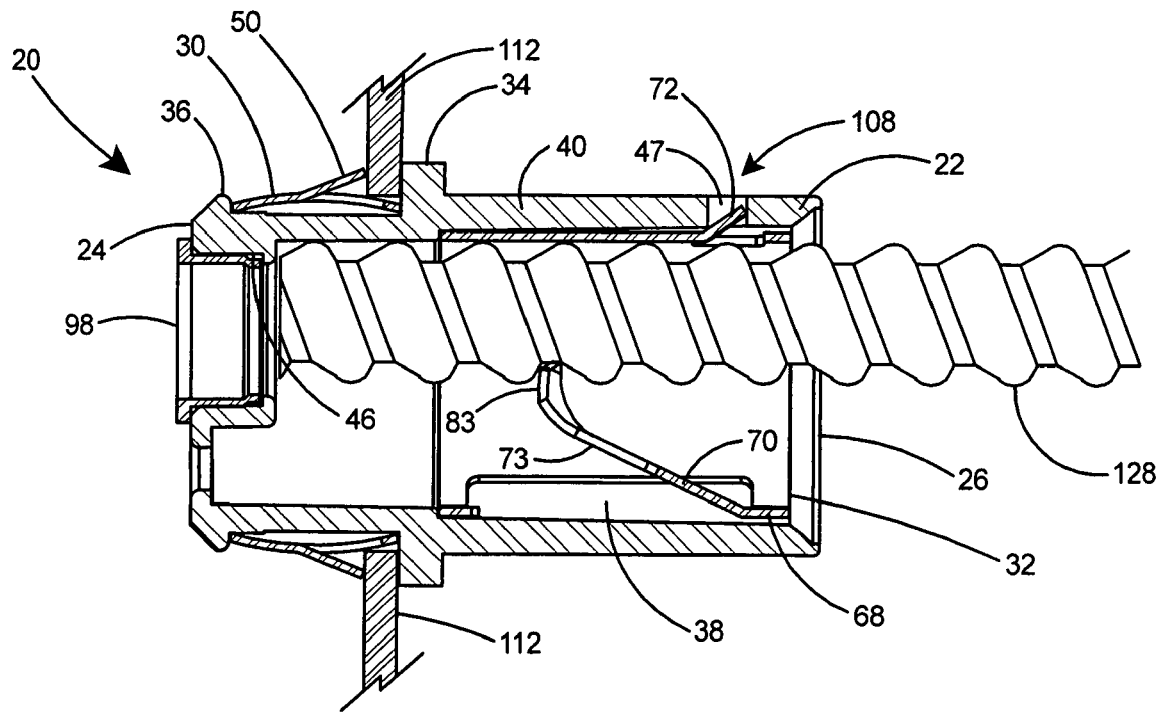
FIG. 22 is a sectional view of the preferred embodiment of the electrical fitting including a cable retainer secured in the trailing end of the connector body and a large diameter MCAP cable secured therein.

Reference is made to FIGS. 21 and 22 for an understanding of the operation of the preferred embodiment of the electrical fitting 20 of the present invention. The electrical fitting 20 is provided as an assembly including the connector body 22, snap ring 30, cable retainer 32, and optionally an insert 98 as shown in FIG. 22. With the cable retainer 32 locked into the cavity 38 at the trailing end 26 of the connector body 22, as shown in FIG. 21, the cable retaining tang 70 extends into the cavity 38 from the flat portion 68 of the cable retainer 32. After the electrical fitting 20 is connected to a panel 112, an electrical cable 126, such as the MCAP cable 126 shown in FIG. 21, is inserted into the trailing end 26 of the fitting 20. Insertion of the electrical cable 126 biases the cable retaining tang 70 outward, thereby pressing the electrical cable 126 against the wall 40 of the connector body 22. The finger-lock exerted by the cable retaining tang 70 against the electrical cable 126 locks it within the connector body 22 and prevents its removal by a force applied rearward thereto to the cable. As shown in FIG. 22, an electrical cable 128 of larger diameter can also be connected to a panel 112 by the electrical connector 20 of the present invention. Although only the first finger 73 is depicted in the sectional view, both fingers flex as the cable 128 is inserted into the trailing end 26 of the connector 20 and lock the cable 128 into the connector 20 as the end portions (such as 83) seat against the cable 128. Thus FIGS. 21 and 22 illustrate the ability of the electrical connector 20 of the present invention to accommodate electrical cables of various diameters.

With reference to FIGS. 23-27, the notch 71, as shown by distance D3 in FIG. 23, preferably extends at least half of the length L3 of the cable retaining tang 70. The end portion 83 of the first finger 73 and the end portion 84 of the second finger 75 are each angled away from the base portion 67 of the cable retaining tang 70. As shown in FIG. 25, the end portion 83 of the first finger 73 is arcuate in shape or bent in an arc out of a plane extending through the first finger 73. The arcuate end portion 83 of the first finger 73 preferably includes a radius, as denoted by R1 in FIG. 25, of between 0.16 and 0.19 inch. As shown in FIG. 27, the end portion 84 of the second finger 75 is planar in shape. Preferably, the planar end portion 84 of the second finger 75 is at an angle, as denoted by angle θ2 in FIG. 27, of between 20 and 40 degrees from the base portion 67 of the cable retaining tang 70.

The fingers 73 and 75 of the cable retaining tang 70 each include an outer side 85, an inner side 86, and distal edges 87 extending from the outer side 85 to the inner side 86. The distal edges 87 preferably include a flat portion 88 along the outer side 85 of the fingers 73 and 75 and an arcuate portion 89 along the inner side 86 of the fingers. Preferably, the notch 71 is at the center of the cable retaining tang 70. Preferably, the radius of arcuate portion 89 on the first finger 73 (see FIG. 24) is between 0.28 and 0.32 inch and the radius of arcuate portion 89 on the second finger 75 (see FIG. 26) is between 0.18 and 0.22 inch Referring to FIGS. 21 and 22, it has been discovered that the several novel features of the electrical fitting 20 of the present invention, including a cable retaining ring 32 having a single tang 70 and multiple fingers 73 and 75 (see FIG. 10), provides unexpected results in that the range of nominal cable sizes that can be accommodated by the electrical connector is greatly expanded. An electrical fitting 20 according to the present invention, for example, can accommodate five nominal sizes of MCAP electrical cables including 12-2, 12-3, 12-4, 10-2, and 10-3. The wide range of cable sizes accommodated by the electrical fitting 20 therefore greatly enhances the utility of the connector and greatly reduces stocking requirements as a single nominal sized connector according to the present invention can take the place of several prior art connectors. With reference to FIGS. 23-27 the two fingers 73 and 75 of the cable retaining tang 70 with their arcuate end portion 83 and planar end portion 84, respectively, enable the wide range of cable sizes as the end portions 83 and 84 securely engage the inserted cable. The arcuate edges 89 enable each finger 73 and 75 to splay outward as a cable is inserted into the trailing end of the connector. The larger the outer diameter of the cable, the more the fingers 73 and 75 will be splayed outward to accommodate the cable. The arcuate edges 89 on each finger 73 and 75 provide more surface contact with the cable and therefore better electrical continuity than prior art tangs with flat edges in which there is very limited contact with the cable.

Preferably the connector body 22 of the present invention is constructed of metal and most preferably of Zamak™, a casting alloy comprised mainly of zinc alloyed with aluminum, magnesium, and copper and available from Eastern Alloys, Maybrook, New York. By constructing the tubular body of Zamak™ or other appropriate metals, the connector body 22 will be electrically conductive and provide good continuity throughout the fitting. The snap ring 30 and cable retainer 32 are preferably constructed of spring steel to impart toughness and flexibility to the various tangs located thereon. The optional insert 98 is preferably constructed of plastic and functions as an antishort bushing to prevent any electrical wires extending through the leading opening of the connector body from fraying, or becoming shorting out against the connector body. The electrical fitting 20 of the present invention is used to secure electrical cables such as Metal Clad All Purpose (MCAP), Health Care Facility Metal Clad All Purpose (HCF MCAP), Metal Clad (MC), flex, or continuous corrugated MC cable to a panel.

Although the description above contains many specific descriptions, materials, and dimensions, these should not be construed as limiting the scope of the invention but as merely providing illustrations of some of the presently preferred embodiments of this invention. Thus the scope of the invention should be determined by the appended claims and their legal equivalents, rather than by the examples given.

What is claimed is:

1. An electrical fitting for securing an electrical cable to a panel or junction box comprising:
    a connector body including a leading end and a trailing end;
    a fastening arrangement on said leading end for securing said leading end of said connector body to said panel or said junction box;
    a cavity in said trailing end of said connector body, said cavity including a wall;
    a substantially tubular cable retainer secured within said cavity, said cable retainer including a leading end and a trailing end;
    a securing arrangement for locking said cable retainer within said cavity of said trailing end of said connector body;
    a cable retaining tang projecting inward from said tubular body and angled toward said leading end of said cable retainer;
    said cable retaining tang including a base portion, an end, and a first finger and a second finger defined by a notch extending from said end of said cable retaining tang; and
    said notch extends at least half of the length of said cable retaining tang.

2. The electrical fitting of claim 1 wherein
    said first finger and said second finger include end portions thereon; and
    said end portions of said fingers angled away from said base portion of said cable retaining tang and toward said trailing end of said cable retainer.
3. The electrical fitting of claim 2 wherein
    said end portion of said first finger is arcuate in shape; and
    said end portion of said second finger is planar in shape.
4. The electrical fitting of claim 2 wherein
    said arcuate end portion of said first finger includes a radius of between 0.16 and 0.19 inch; and
    said planar end portion of said second finger is at an angle of between 20 and 40 degrees from said base portion.
5. The electrical fitting of claim 1 wherein said first finger extends a lesser distance from said tubular cable retainer than said second finger.
6. The electrical fitting of claim 1 wherein said notch is at the center of said cable retaining tang.
7. The electrical fitting of claim 1 wherein
    said cavity is of a smaller diameter than said cable retainer;
    said cable retainer includes an unbiased state; and
    said cable retainer in said unbiased state is of a larger diameter than said diameter of said cavity.
8. The electrical fitting of claim 1 wherein said securing arrangement for said cable retainer includes
    an opening in said wall in said trailing end of said connector body;
    a locking tang projecting outward from said cable retainer, said locking tang in alignment with said opening in said wall of said connector body; and
    an outward bias of said cable retainer against said wall of said cavity, whereby said locking tang projects through said opening of said connector body and locks said cable retainer within said cavity of said connector body.
9. The electrical fitting of claim 1 wherein
    said cable retainer is formed from a flat blank of spring steel having two ends; a first of said ends of said blank includes a tab;
    a second of said ends of said blank includes a groove therein; and
    said tab extends into said groove after said blank is formed into said cable retainer.
10. The electrical fitting of claim 1 wherein said connector body includes
    a central flange between said trailing end and said leading end; and
    an end flange on said leading end of said connector body.
11. The electrical fitting of claim 1 including
    a partial closure on said leading end of said connector body;
    an opening in said partial closure; edges on said partial closure surrounding said opening; and
    an insert in said opening, said insert substantially covering said edges of said partial closure.
12. The electrical fitting of claim 11 wherein
    said connector body is constructed of metal; and
    said insert is constructed of plastic.
13. The electrical fitting of claim 1 wherein said fastening arrangement includes a cylindrical snap ring on said leading end of said connector body.
14. The electrical fitting of claim 1 wherein said fastening arrangement includes
    threads on said leading end of said connector body; and
    a nut for engaging said threads on said leading portion.
15. An electrical fitting for securing an electrical cable to a panel or junction box comprising:

a connector body including a leading end and a trailing end;

a fastening arrangement on said leading end for securing said leading end of said connector body to said panel or said junction box;

a cavity in said trailing end of said connector body, said cavity including a wall;

a substantially tubular cable retainer secured within said cavity, said cable retainer including a leading end and a trailing end;

a securing arrangement for locking said cable retainer within said cavity of said trailing end of said connector body;

a cable retaining tang projecting inward from said tubular body and angled toward said leading end of said cable retainer;

said cable retaining tang including a base portion, an end, and a first finger and a second finger at said end of said cable retaining tang;

said fingers of said cable retaining tang each include an outer side, an inner side, and distal edges extending from said outer side to said inner side; and said distal edges include a flat portion along said outer side of said fingers and an arcuate portion along said inner side of said fingers.

16. An electrical fitting for securing an electrical cable to a panel or junction box comprising:

a connector body including a leading end and a trailing end;

a fastening arrangement on said leading end for securing said leading end of said connector body to said panel or said junction box;

a cavity in said trailing end of said connector body, said cavity including a wall;

a substantially tubular cable retainer secured within said cavity, said cable retainer including a leading end and a trailing end;

a securing arrangement for locking said cable retainer within said cavity of said trailing end of said connector body;

a cable retaining tang projecting inward from said tubular body and angled toward said leading end of said cable retainer;

said cable retaining tang including a base portion, an end, and a first finger and a second finger at said end of said cable retaining tang;

said cable retainer includes a cylindrical portion and a flat portion; and said cable retaining tang projects inward from said flat portion of said cable retainer.

\* \* \* \* \*